(12) United States Patent
Haywood et al.

(10) Patent No.: US 11,567,803 B2
(45) Date of Patent: Jan. 31, 2023

(54) INTER-SERVER MEMORY POOLING

(71) Applicant: Rambus Inc., San Jose, CA (US)

(72) Inventors: Christopher Haywood, Chapel Hill, NC (US); Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 113 days.

(21) Appl. No.: 17/084,392

(22) Filed: Oct. 29, 2020

(65) Prior Publication Data

US 2021/0132999 A1 May 6, 2021

Related U.S. Application Data

(60) Provisional application No. 63/061,943, filed on Aug. 6, 2020, provisional application No. 62/930,173, filed on Nov. 4, 2019.

(51) Int. Cl.
| | |
|---|---|
| *G06F 12/00* | (2006.01) |
| *G06F 9/50* | (2006.01) |
| *G06F 9/451* | (2018.01) |
| *G06F 12/02* | (2006.01) |
| *G06F 12/1009* | (2016.01) |
| *G06F 12/1072* | (2016.01) |

(52) U.S. Cl.
CPC ............ *G06F 9/5016* (2013.01); *G06F 9/452* (2018.02); *G06F 9/5077* (2013.01); *G06F 12/0238* (2013.01); *G06F 12/1009* (2013.01); *G06F 12/1072* (2013.01); *G06F 2212/7201* (2013.01)

(58) Field of Classification Search
CPC .......................... G06F 2212/60; G06F 12/0877
See application file for complete search history.

(56) References Cited

U.S. PATENT DOCUMENTS

| | | |
|---|---|---|
| 5,864,876 A | 1/1999 | Rossum et al. |
| 5,914,730 A | 6/1999 | Santos et al. |
| 5,918,249 A | 6/1999 | Cox et al. |
| 5,920,881 A | 7/1999 | Porterfield |

(Continued)

OTHER PUBLICATIONS

Pinto, Christian et al., "Teleporting Memory Across Two Servers", IBM Research Blog, IBM Research Europe, Aug. 2020, https://www.ibm.com/blogs/research/2020/08/teleporting-memory-across-two-servers/, 11 pages.

*Primary Examiner* — Shawn X Gu
*Assistant Examiner* — Mohammad S Hasan
(74) *Attorney, Agent, or Firm* — Charles Shemwell

(57) ABSTRACT

A memory allocation device for deployment within a host server computer includes control circuitry, a first interface to a local processing unit disposed within the host computer and local operating memory disposed within the host computer, and a second interface to a remote computer. The control circuitry allocates a first portion of the local memory to a first process executed by the local processing unit and transmits, to the remote computer via the second interface, a request to allocate to a second process executed by the local processing unit a first portion of a remote memory disposed within the remote computer. The control circuitry further receives instructions via the first interface to store data at a memory address within the first portion of the remote memory and transmits those instructions to the remote computer via the second interface.

23 Claims, 6 Drawing Sheets

(56) References Cited

U.S. PATENT DOCUMENTS

| | | | |
|---|---|---|---|
| 6,226,671 B1* | 5/2001 | Hagersten | G06F 12/0284 709/215 |
| 6,272,612 B1* | 8/2001 | Bordaz | G06F 12/121 711/170 |
| 6,321,276 B1* | 11/2001 | Forin | G06F 12/1081 710/5 |
| 6,336,180 B1 | 1/2002 | Long et al. | |
| 6,487,628 B1 | 11/2002 | Duong et al. | |
| 6,598,130 B2 | 7/2003 | Harris et al. | |
| 6,701,421 B1 | 3/2004 | Elnozahy et al. | |
| 6,925,547 B2 | 8/2005 | Scott et al. | |
| 7,000,087 B2* | 2/2006 | Atherton | G06F 9/5016 711/170 |
| 8,392,565 B2* | 3/2013 | Tripathi | G06F 13/387 709/226 |
| 8,938,571 B1* | 1/2015 | Vincent | G06F 9/5077 710/118 |
| 9,465,729 B2 | 10/2016 | Solihin | |
| 9,766,916 B2 | 9/2017 | Arroyo et al. | |
| 10,241,956 B2 | 3/2019 | Anumula et al. | |
| 2001/0016879 A1 | 8/2001 | Sekiguchi et al. | |
| 2005/0055406 A1* | 3/2005 | Singhai | H04W 8/04 709/206 |
| 2005/0223184 A1* | 10/2005 | Russell | G06F 12/0284 711/170 |
| 2006/0195618 A1 | 8/2006 | Arndt et al. | |
| 2006/0195623 A1 | 8/2006 | Arndt et al. | |
| 2006/0236063 A1 | 10/2006 | Hausauer et al. | |
| 2014/0089585 A1* | 3/2014 | Nakajima | G06F 12/0871 711/E12.017 |
| 2019/0042133 A1* | 2/2019 | Peterson | G06F 3/0635 |
| 2019/0042294 A1* | 2/2019 | Guim Bernat | H04L 49/9047 |
| 2019/0102292 A1 | 4/2019 | Agarwal et al. | |
| 2019/0102311 A1 | 4/2019 | Gupta et al. | |
| 2020/0125490 A1* | 4/2020 | Blagodurov | G06F 3/061 |
| 2020/0136996 A1* | 4/2020 | Li | H04L 47/125 |

* cited by examiner

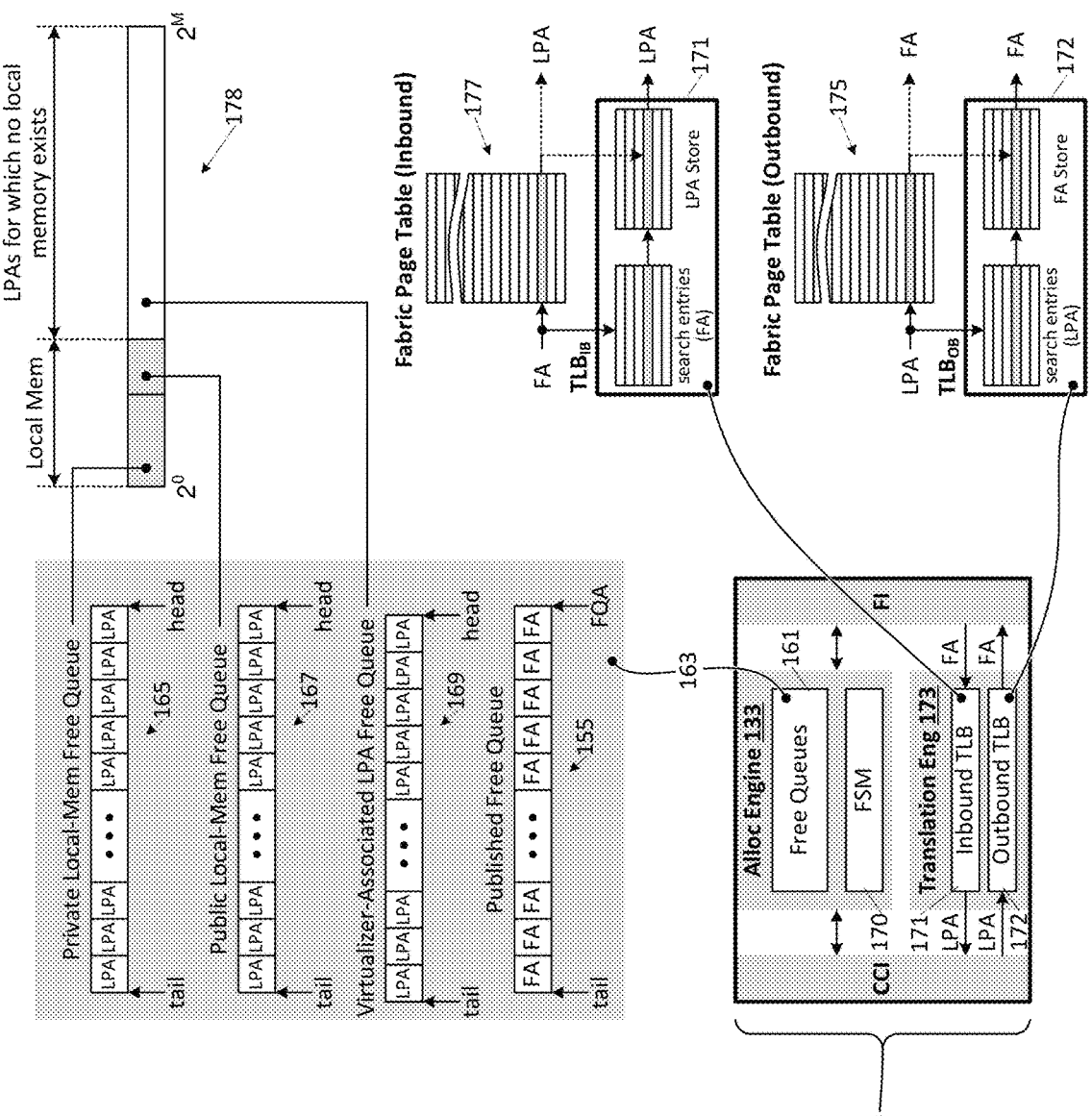
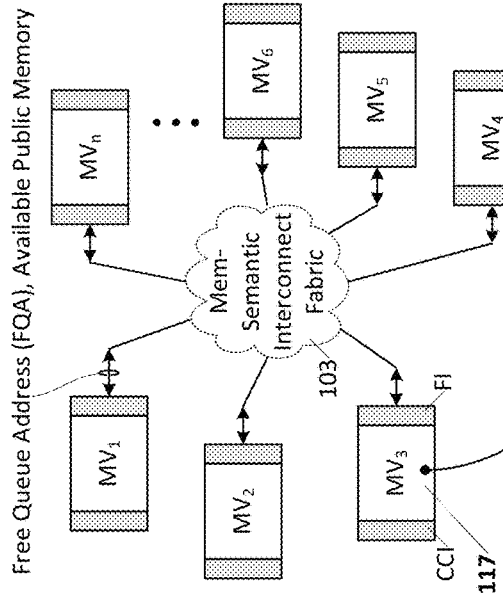
FIG. 2

INTER-SERVER MEMORY POOLING

CROSS REFERENCE TO RELATED APPLICATIONS

This application hereby incorporates by reference and claims priority to U.S. provisional application No. 62/930,173 filed Nov. 4, 2019 and U.S. provisional application No. 63/061,943 filed Aug. 6, 2020.

DRAWINGS

The various embodiments disclosed herein are illustrated by way of example, and not by way of limitation, in the figures of the accompanying drawings and in which like reference numerals refer to similar elements and in which:

FIG. 2 illustrates exemplary information exchange between memory virtualizers deployed within respective memory-pooling servers together with a more detailed memory virtualizer implementation;

Figure 5:
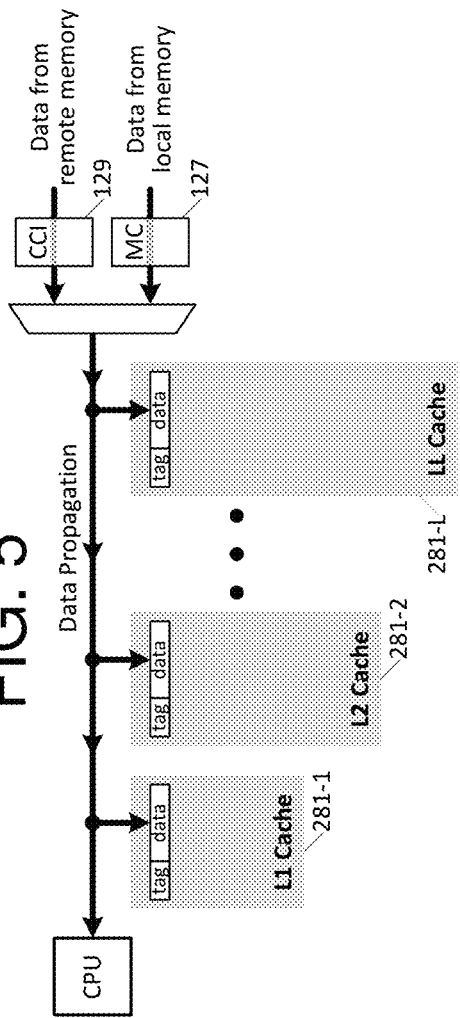
Figure 6:
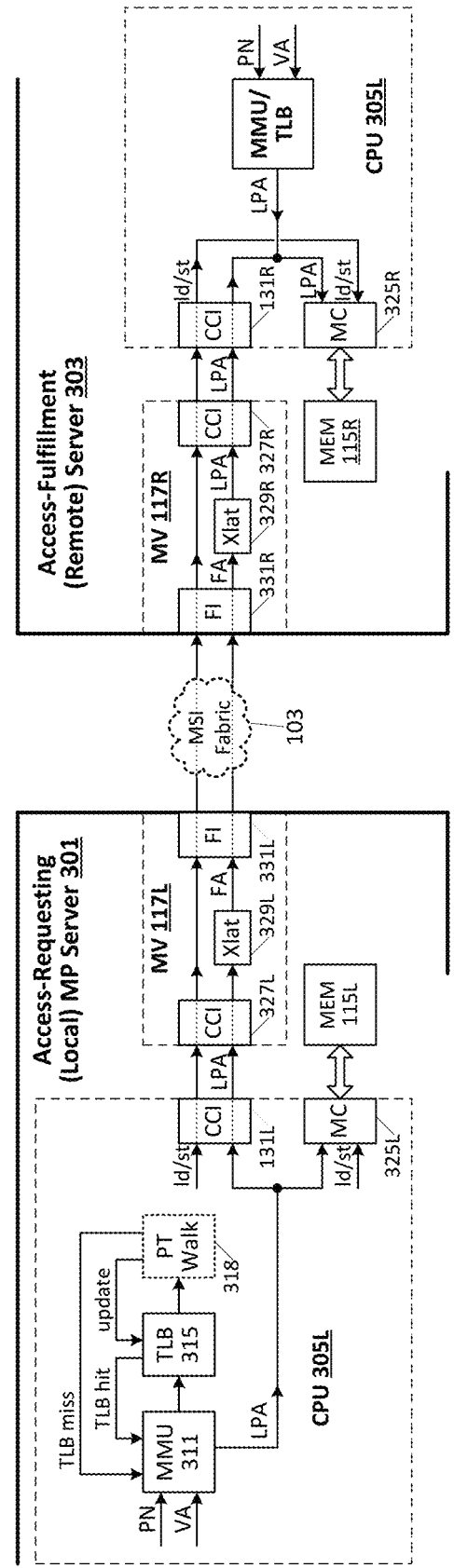
Figure 7:
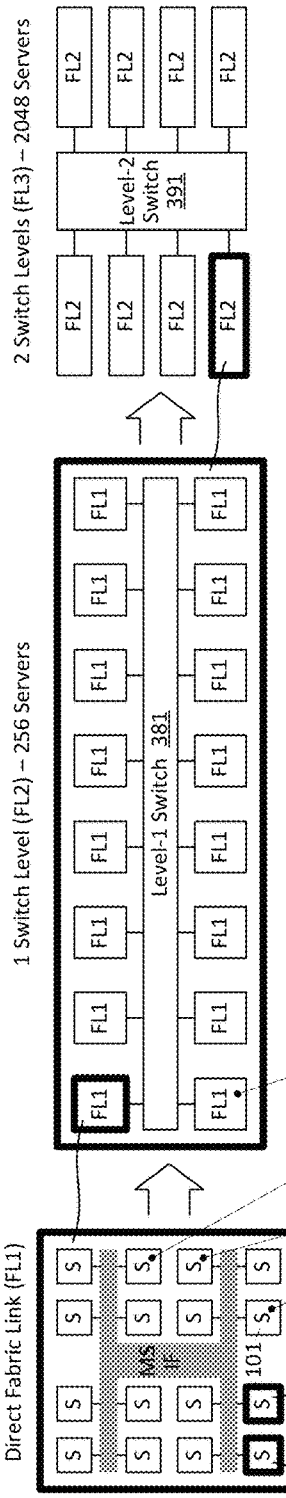
Figure 8:
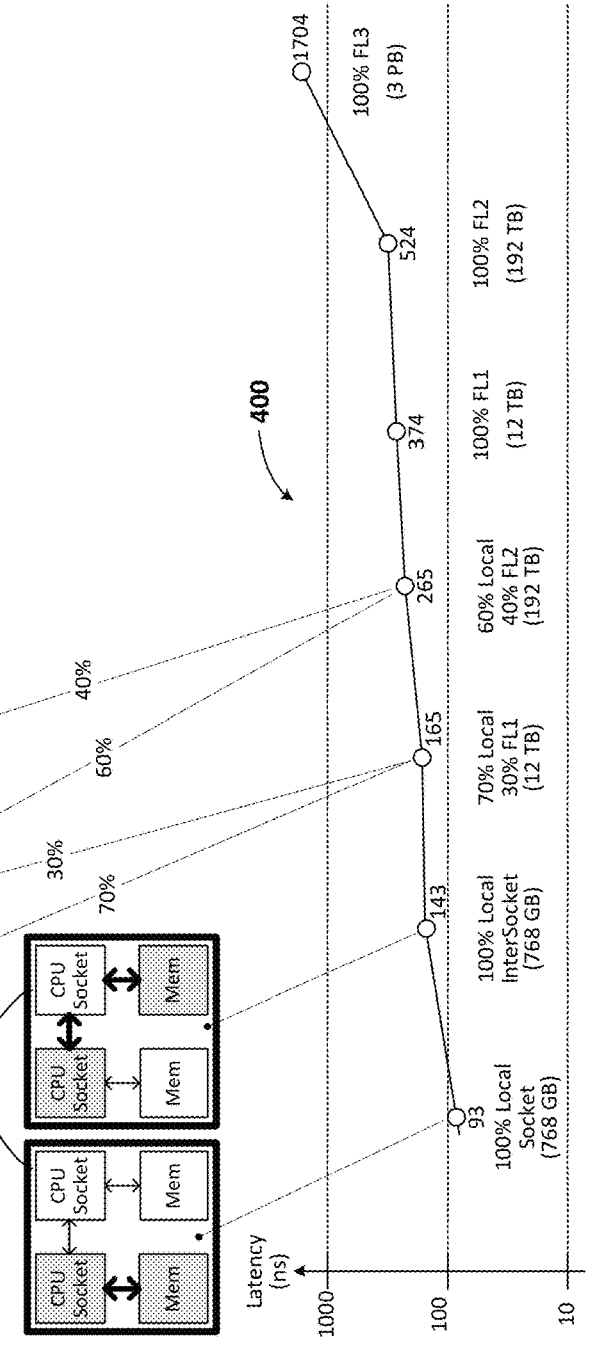

FIG. 5 presents a conceptual example of read data flow and data population within a cache hierarchy that includes multiple levels of data cache structures;

FIG. 6 illustrates more detailed memory access circuitry that may be deployed within local and remote fabric-interconnected memory-pooling servers;

FIG. 7 illustrates an exemplary hierarchical organization of memory-pooling servers within a data center; and FIG. 8 contrasting feature-opaque and feature-exposed memory allocation requests that may be implemented within memory-pooling computing devices (e.g., servers).

DETAILED DESCRIPTION

In various embodiments disclosed herein, a memory-pooling server computer dynamically allocates pages of local memory to one or more other server computers, executing memory write and read operations with respect to each memory page allocated to another server computer in response to load and store commands issued by that other server computer. In a number of embodiments, the memory-pooling server computer ("memory-pooling server") publishes/exposes a "free queue" of addresses and related information that enables allocation of local memory pages to the other server computers, and each of the other server computers likewise implements a free-queue publishing memory-pooling server such that the complete set of published free queues defines a collective memory pool backed by physical memory pages distributed among the memory-pooling servers. Through this arrangement and server interconnection through an interconnect fabric that supports transmission of load and store commands (memory reads and writes), physical memory in any memory-pooling server may be allocated to and load/store-accessed by any another memory-pooling server—for example, allowing allocation of any memory in a data center to a given server and thus avoiding the memory stranding (memory siloed within individual servers/operating-systems) that plagues conventional data center installations. From a data-center architecture perspective, inter-server memory allocation (e.g., load/store access to memory on one server granted exclusively or non-exclusively to another server) simplifies customer provisioning, providing addition design freedom in virtual-machine (VM) packing, enabling new customer offerings including virtual machines with vastly larger memory footprints (extending across physical memories of two or more servers) and enabling deployment of less expensive individual servers having, for example, less on-server memory (as each has the ability to obtain allocations of and exclusive load/store access to off-server memory on demand) and/or less expensive processors as memory-attach points.

In free-queue-publishing and other embodiments, memory access requests are routed alternately to local or remote memory (the latter referring to either a local memory installation on a memory-pooling server other than the server that sourced the memory-access request or a local memory installation on memory-only node that lacks a CPU or other compute function) in a manner transparent to the local operating system and hosted processes. Further, in a number of embodiments, page table maintenance is off-loaded from a server's operating system (OS)/kernel to a memory virtualizing component that interfaces to counterpart memory virtualizers (resident on other memory-pooling servers) through an interconnect fabric over which memory load and store commands may be conveyed. Additionally, data and address caching structures (e.g., L1, L2, L3, . . . LL, TLB) are populated and accessed identically for both local and remote memory accesses, populating the data caches with data retrieved from either local or remote memory installations, and populating the TLB (or other address-translation structures) with virtual-to-physical address translations for both local and remote memory pages.

Physical location and/or other features of allocated/accessed memory (on the "local" server hosting/executing the process requesting the memory allocation/access or on a remote server) may be hidden from the allocation-requesting process—abstracted in that the process perceives local and remote memory identically during allocation and subsequent load/store access—or exposed to that process to enable specification of various differentiated-features in a process-issued allocation request (e.g., specified latency, location, server-type, encryption or other security capability, non-volatile backing storage on security breach/power-loss, zeroed or otherwise initialized data storage, etc.) and in a corresponding memory-deallocation/free request (e.g., clear content of allocation before returning to collective memory pool, leave data in place, etc.). In either case (i.e., memory-location/feature-aware or unaware allocations), the process-hosting operating system (or the process itself) may apply policy-based rules or algorithms to determine whether local memory, remote memory, or a blend of local and remote memory is to be allocated to a given process, considering such factors as allocation size request, number of data-center switch-levels traversed to access remote memory (and hence degree of latency), and so forth. Also, inter-process messaging or other data-sharing between processes executing on different servers may be effected by "pointer passing"—allocation of memory to one process (which loads the memory with content), followed by deallocation and allocation to another process with loaded data left in place. These and other embodiments and features are discussed in further detail below.

Figure 1:
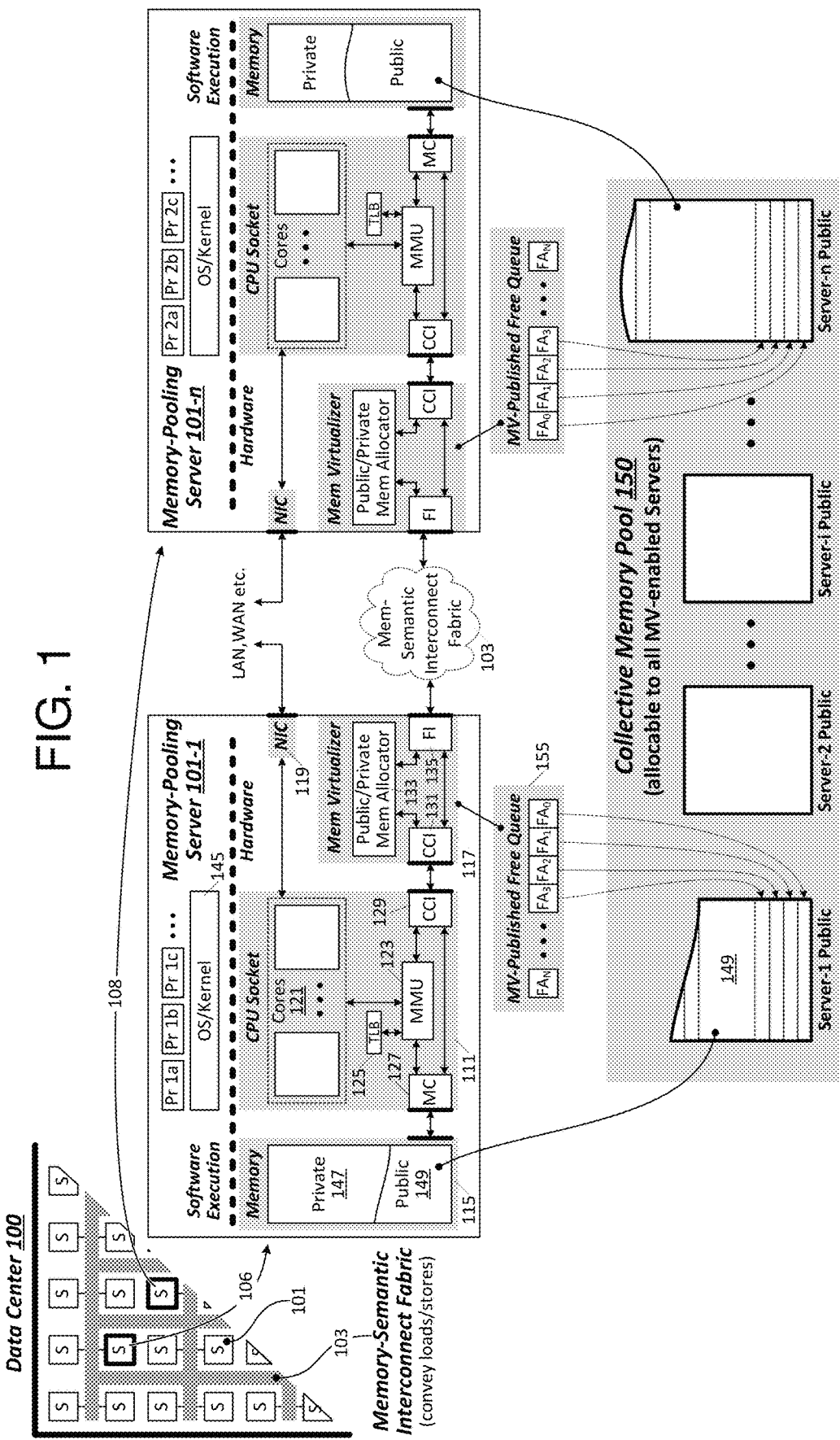
FIG. 1 illustrates an exemplary data center having a set of 'n' memory-pooling servers coupled to one another via a memory-semantic interconnect fabric.

FIG. 1 illustrates an exemplary data center 100 having a set of 'n' memory-pooling servers 101 ("MP server" or "server") coupled to one another via a memory-semantic interconnect fabric 103. As shown in the embodiments at 106 and 108 (showing exemplary detail within MP servers 101-1 and 101-n, respectively), each MP server includes one or more CPUs (central processing units) 111, a memory subsystem 115 and a memory-virtualizer 117, the latter coupled to counterpart virtualizers 117 of other MP servers via interconnect fabric 103. Each server 101 may also include a network interface card 119 (NIC) or the like to enable connection to a conventional communication network (e.g., local area network, wide area network, etc., that enables application-layer data transport according to standard-defined physical interconnect and protocol suites such as Ethernet, TCP/IP, etc.). In one embodiment, each CPU includes one or more processor cores 121 together with various supporting components including, for example and without limitation, a memory-management unit 123 (MMU), translation lookaside buffer 125 (TLB), memory controller 127 (MC) and cache-coherent interface 129 (CCI)—functional circuit blocks integrated within an integrated circuit (IC) package installed within a socket on a motherboard (or blade or other printed circuit board) and thus occasionally referred to herein as a CPU socket (i.e., to emphasize the various functionality of the socketed component aside from core instruction processing). The memory subsystem 115—assumed for purposes of example to be dynamic random access memory (DRAM) organized in dual inline memory modules (DIMMS)—is likewise mounted in one or more motherboard or blade sockets (e.g., DIMM sockets) and coupled via conductive data and control traces to the CPU socket and more specifically to memory control component 127 via one or more memory access channels. Memory virtualizer 117 is similarly socketed on the motherboard (or backplane blade) and coupled to the CPU socket via a signaling link that extends between a cache-coherent interface 131 within the virtualizer and its CPU-side counterpart (129). As discussed below, memory virtualizer additionally includes a public/private memory allocator (133) and a fabric interface (135), the former serving as a centralized memory allocation coordinator for all local memory allocated to processes executed by the local CPU core and remote (other server) CPU cores, and the latter enabling transmission and reception of inter-server memory allocation requests and memory load/store instructions via the memory-semantic interconnect fabric 103 (e.g., implemented by Gen-Z or other load/store memory interconnect).

Though the general memory-pooling server architecture shown at 106 (and identically in counterpart server at 108) is carried forward in discussions that follow, more specific implementations may vary in numerous aspects, all of which may be applied within the various presented embodiments. For example, the signaling link between cache coherent interfaces 129 and 133 (i.e., CPU-virtualizer interconnect) may be any standardized signaling link (e.g., peripheral component interconnect express (PCIe), HyperTransport (HT), etc.) that supports standardized memory-semantic/cache-coherent protocols including, for example, and without limitation Compute Express Link (CXL), Open Coherent Accelerator Processor Interface (OpenCAPI), etc. Also, any or all socketed components (which may have any form factor, including printed circuit board with edge connector and mounted integrated circuit components, socket-inserted integrated circuit components, etc.) may instead be directly mounted (e.g., soldered) to an interconnect substrate (motherboard, blade, etc.) and/or integrated with others of those components within an integrated circuit package (e.g., integrated within an IC die or within a system-on-chip or other multi-die IC package). Additionally, while the memory-pooling servers 101 may generally include various hierarchically accessed storage devices (including mass-storage media in the form of solid-state or mechanically accessed disk), the memory subsystem shown at 115 in FIG. 1 implements the high-bandwidth, low-latency operating memory (main memory, system memory, system RAM, etc.) from which the CPU fetches a run-time stream of executable instructions and to which the CPU directs data load and store operations on behalf of code-execution-instantiated entities (operating system (OS) or kernel, and processes hosted by the kernel and underlying CPU). In a number of embodiments, memory 115 is implemented by dynamic random access memory (DRAM) organized in conventional dual inline memory modules (DIMMS) and accessed through successive row activation and column read/write operations. In alternative embodiments, other low-latency, high-bandwidth storage technologies (e.g., capable of supplying instruction and data at or near CPU demand rates) may implement memory 115 instead of or together with DRAM components and any DRAM components (or other memory technologies) may be mounted to or within memory modules other than DIMMs (e.g., individually socketed multi-die IC package).

Still referring to FIG. 1, during server boot-up or sometime after, an operating system/kernel 145 (i.e., functional instantiation effected by CPU execution of software/code—used interchangeably and comprehensively herein to include, for example and without limitation, a hypervisor, virtual machine manager (VMM), etc.) within each memory-pooling server 101 partitions the physical address space of the local CPU socket(s) by assigning a subset of that address space (a set of LPAs) to local memory 115 and associating the remaining LPAs with memory virtualizer 117. Through this operation, memory virtualizer 117 is perceived by local CPUs as a supplemental memory controller (accessible via cache coherent interface 129) to which LPAs may be issued together with load/store instructions. Memory virtualizer 117 responds to memory allocation and access requests by bridging those requests via interconnect fabric 103 for fulfillment within a far (remote) server, optionally fulfilling some portion of the allocation/access requests out of memory resident on the virtualizer ("virtualizer-attached" memory), if present. In either case, the complexity of the memory virtualizer operation is abstracted from the local CPU (and local operating system and local processes instantiated by the local CPU) as the CPU merely need issue the load/store instructions to an LPA associated with the memory virtualizer as it would with a conventional memory controller. The kernel may (at boot-up or thereafter) also partition the LPA sub-range mapped to local memory 115 into private and public LPA ranges, reserving the private memory range or "private or reserved memory" 147 for exclusive load/store access by local CPU sockets 111 and, conversely, enabling memory mapped to the public LPA range ("public memory" 149) to be allocated to other memory-pooling servers via memory virtualizer 117, effectively contributing or donating the public memory to a collective memory pool 150 from which physical memory pages may be allocated to a requesting process executing on any memory-pooling server.

In one embodiment, the kernel communicates the local-private memory, local-public memory and virtualizer-associated LPA sub-ranges to memory allocation engine 133 which in turn constructs a corresponding set of free queues containing, as queue elements (or linked-list elements), LPAs within the corresponding sub-range. The memory allocation engine may also construct a fabric-address (FA) free queue to be published/exposed to remote virtualizers In an embodiment shown in FIG. 2, memory virtualizers 117 deployed within respective MP servers exchange head-of-published-free-queue addresses (FQAs) and available-memory metrics (i.e., amount of local memory available within a given MP server for allocation to other servers and optionally an indication of quantity of public memory already allocated) via interconnect fabric 103 or other communication channel, updating the available-memory metric from time to time or in response to allocation events. Through this information exchange, each memory virtualizer 117 (i.e., $MV_1$-$MV_n$) is informed, at any given time, of volume and location of allocable memory on specific remote servers and thus may issue targeted allocation requests with generally assured success. Each memory virtualizer, shown for example in detail view 160, also maintains a set of free queues 161 (shown in further detail view 163) that include the four free queues discussed above—that is, a published free queue 155 (list of fabric addresses (FAs)), a private local-memory free queue 165 (list of LPAs that resolve to local private memory), a public local-memory free queue 167 (list of LPAs corresponding to local public memory), and a virtualizer-associated LPA free queue 169, the latter containing LPAs to be mapped on demand (and via fabric addresses shared between MP servers) to LPAs for public local memory within other servers. In the depicted embodiment, a finite state machine 170 (FSM) manages the head and tail pointers for each queue (i.e., advancing head and tail pointers to pop elements off and add elements to a given free queue, respectively) and related inbound/outbound translation look aside buffers 171, 172 within translation engine 173. Where the memory virtualizer contains its own memory installation (i.e., virtualizer-attached memory), LPAs within the virtualizer-associated LPA free queue may also map to that memory.

In a page-fault-triggered allocation scheme, a memory allocation request is triggered when a process issues a load/store to a virtual address (VA) for which there is no associated local physical address—a page-fault scenario that invokes the local operating system's page-fault handler to map the virtual address to a local physical address for an available page of memory. In contrast to conventional systems in which LPAs having no local physical memory association are unused (i.e., at least for memory access purposes), an MP server according to embodiments herein maps those extra (beyond the local physical memory) LPAs to the memory virtualizer component (as discussed above) which, in turn, associates the LPAs with remote memory (and/or virtualizer-attached memory). By this operation, LPAs issued by the CPU's memory management unit (i.e., obtained by applying virtual address to TLB and, if necessary, in a VA-to-LPA page table walk) may be directed to either the local memory controller (if the LPA decodes to a page of local memory) or to the virtualizer. In the latter case, the virtualizer uses the LPA to execute a cross-fabric load or store within the memory on a remote server, hiding the remote nature of the accessed memory from the local CPU and thus enabling the local CPU to perceive and exploit a dramatically increased memory capacity as compared to the local physical memory alone. In effect, the memory virtualizer appears to the local CPU to be simply another local memory controller (albeit accessible via the cache-coherent interface) to which loads/stores at a VA-indexed (virtual address applied to look up) LPA may be issued.

In the FIG. 2 embodiment, each memory virtualizer 117 fulfills all memory allocation requests from local CPUs (coordinating with remote virtualizers as necessary to complete allocations of remote memory) and also supports allocation requests from remote virtualizers. Allocation requests from local CPUs are generally fulfilled according to predetermined or programmed fulfillment policies (e.g., first out of local private memory, then out of local public memory, then out of remote public memory), though parameterized requests specifying memory location and/or characteristics (e.g., average access latency) may be supported/enabled in various embodiments and/or operating configurations. To fulfill an allocation request from a local CPU out of local memory, memory virtualizer pops (de-links) an LPA from the head of the private local-memory free queue 165 and stores the de-linked LPA within the system page table (i.e., the page-table walked by the MMU) at a location indexed by a virtual address (VA) supplied by the operating system's page-fault handler (VA combined in a tuple with process identifier for process that triggered the page fault). Thereafter, the page-faulting memory access is completed by the local CPU socket (i.e., page-table walk executed by socket-resident memory management unit (MMU) to retrieve the LPA from the newly created page-table entry and load the LPA into the socket-resident TLB, followed by application of LPA to local memory controller) without involvement from the memory virtualizer (i.e., no additional overhead as compared to a conventional memory access). Memory virtualizer 117 fulfills a local-CPU allocation request out of public local memory in essentially the same way, but popping the LPA off the public local-memory free queue 167 instead of the private local-memory free queue and then updating the system page table/TLB as in the private local memory allocation. To fulfill an allocation request from a local CPU out of remote memory, the virtualizer once again populates the system page table and socket-resident TLB with a VA-indexed LPA (popping the LPA off the virtualizer associated LPA free queue 169 instead of either local memory free queue) but then additionally obtains a fabric address (FA) from a remote virtualizer (i.e., reading the published FQA of a selected MP server) and loads the remotely supplied FA into outbound LPA-to-FA translation structures, including a virtualizer-maintained outbound fabric page table 175 (i.e., page table indexed by local physical address to retrieve corresponding fabric address) and corresponding outbound TLB 172 (searched by LPA to yield corresponding fabric address on TLB hit and outbound fabric page table walk on TLB miss). During a subsequent load/store to a virtual address that resolves to remote memory, the local MMU (resident within the CPU socket) translates the VA into an LPA associated with the virtualizer (i.e., the virtualizer-associated LPA popped from queue 169) which, by virtue of that association, is applied to the outbound TLB 172 within translation engine 173 to yield the fabric address read from the remote virtualizer FQA. That fabric address is then transmitted to the remote virtualizer together with the load/store instruction (and write data in the case of a store instruction).

Continuing with remote memory allocation, the memory virtualizer within the remote server (i.e., the allocation-fulfillment virtualizer and its host server) responds to the published free queue read (i.e., read from the fulfillment-virtualizer-published FQA by the allocation requesting virtualizer) by (i) popping an FA off the head of the free queue 155 published by the remote virtualizer (and returning the de-linked FA to the allocation-requesting virtualizer), (ii) popping an LPA off the head of the public local-memory free queue 169 (within the remote virtualizer), and (iii) storing the de-linked LPA within inbound FA-to-LPA translation structures (i.e., storing LPA in FA-indexed location within inbound fabric page table and FA-associated entry within inbound TLB 173). During a subsequent load/store issued by the remote virtualizer (i.e., the virtualizer that requested the allocation) together with the FQA-obtained FA, the inbound FA is translated to the corresponding LPA via inbound TLB 171 (walking the inbound fabric page-table 177 in the case of a TLB miss) followed by application of that LPA and inbound load/store instruction to the memory controller local to the fulfillment virtualizer. Thus, a load/store instruction directed to remote-server memory triggers three address translations: first from a process-supplied VA to a virtualizer-associated LPA within the MMU/TLB of the local CPU, then from the virtualizer-associated LPA to a fabric address within the outbound TLB (with outbound fabric page table walk as necessary) of the local virtualizer, and then (after transmission of the FA to the access fulfilment server) from the FA to the remote-server LPA within the inbound TLB (with inbound fabric page table walk as necessary) of the access-fulfilling (remote) virtualizer.

In one embodiment, each memory virtualizer 117 reports public local memory volume based on the depth of the published free queue 155—a depth reduced by each FA de-link event (FQA read) and increased by each FA re-link event (i.e., when a given allocation is freed/released) and thus naturally maintained by local memory allocation to (and release by) a remote server. Because no FA is needed (and thus no FA popped from published free queue 155) for allocation of local public memory to locally-hosted processes, a mechanism is provided to revise the length of published free queue 155 whenever local public memory is allocated to a local CPU and thus ensure correct reporting of allocable public local memory. In one embodiment, for instance, a shadow tail pointer is adjusted to shorten the number of externally reported elements (FAs) between the head and shadow-tail of the published free queue—effectively reducing reported volume of allocable public memory—in response to allocations of local public memory to local CPUs. Upon local-process release of a local public memory allocation, the shadow tail pointer is advanced into the linked list between the shadow tail and actual tail of the published free queue, increasing the reported volume of allocable public memory. In other embodiments, the volume of allocable public memory is pegged to the length of the virtualizer-associated LPA free queue instead of the published free queue (which may, for example, have a sufficiently large number of elements to enable allocation of the entirety of the public local memory to remote processes and may be unaltered during allocation of public local memory to local processes), or FAs may be popped off the head of the published free queue for both local and remote allocations of local public memory—in the former case, with the FA being stored within the inbound translation structures (fabric page table 177 and TLB 171) to enable restoration when the corresponding LPA is freed by local (allocation-requesting) process, but not otherwise exposed outside the local virtualizer. More generally, the memory virtualizer may implement the published free queue function (producing a fabric address in response to read at FQA) in various ways that do not require management or implementation of an underlying queue structure. For example, the virtualizer may synthesize an FA on the fly (e.g., heuristically or algorithmically in response to an FQA read) and map the FA to an LPA concurrently with or prior to returning the FA to the remote virtualizer. In such embodiments, the FA generator/synthesizer is perceived as a queue by remote memory virtualizers, but internally treats the FQA read as, for example, an API call that triggers on-demand FA generation and association of that FA with an LPA within in the inbound fabric page table 177 and TLB 171—the FA/LPA association (page table and/or TLB population) occurring before or while the FA is transmitted to the requesting virtualizer. For each of the various FA production embodiments (i.e., de-link from pre-loaded queue, generate on the fly, etc.), the LPA/FA page tables can be used to deallocate the page when the fabric address is freed by the far server.

While fulfillment of a remotely requested memory allocation and memory access (i.e., popping FA from published free queue and executing load/store at that FA) is implemented in the foregoing embodiment without engaging address translation structures within the allocation/access fulfillment server (i.e., VA-to-LPA translation structures within memory-allocated server not used), the inbound fabric address may be converted first to a virtual address within the fulfillment virtualizer (e.g., with an MMU/TLB structure implemented within the virtualizer for that purpose) with the virtual address being supplied to a CPU socket local to the fulfillment virtualizer for translation to an LPA (and ensuing application of that LPA to the local memory controller). In such an embodiment, four address translations are executed in a remote memory access—process-supplied VA to requestor LPA, requestor LPA to FA, FA to fulfillment-side VA, and finally fulfillment VA to fulfillment-server LPA, with that final LPA applied to the fulfillment-server memory controller to complete the memory access.

Referring to the exemplary LPA range (addresses from $2^0$ to $2^M$) shown at 178 in FIG. 2 (i.e., in which finite state machine 170 within the exemplary memory virtualizer at 160 manages the various free queues shown at 163, directs transmissions of fabric addresses and load/store instructions via the fabric interface (FI), coordinates with the host-server CPUs via cache-coherent interface (CCI), and manages population of TLBs and fabric page tables within or accessed by translation engine 173), it is generally the case that much more of the local physical address range will be used (i.e., mapped directly or indirectly to physical memory resources) within a memory-pooling server than in a conventional server (in which only the local memory LPA sub-range would be used). In effect, the local physical addresses outside the range mapped to local memory are used by the memory virtualizer to enable local CPU/OS/processes to issue load/stores via interconnect fabric 103—that is, the memory virtualizer presents, to the local CPU/OS/processes, memory physically resident on other servers as being local memory (i.e., emulating a local memory installation and memory controller for that emulated local memory). Also, while the fabric addresses recorded within the published free queues of fabric-interconnected virtualizers may be generated and assigned according to any practicable scheme, in at least one embodiment each virtualizer is assigned its own fabric address range (e.g., 64-bit address space) with each queue-popped fabric address being combined (e.g., in a tuple) with an additional node-ID address field that controls transaction routing through the load/store interconnect fabric. Accordingly, the available fabric address space may be substantially larger than the LPA range and thus may not be entirely utilized. This is perfectly acceptable in most applications as no 1:1 FA-to-LPA relationship is required—i.e., any locally allocated LPAs (LPAs used by local processes) would not need a corresponding FA. Conversely, while any FAs supplied to remote servers (i.e., via FQA read) may have a 1:1 mapping with LPAs, that mapping would be managed by translation engine 173 within the virtualizer (with fabric page tables 175, 177 stored in virtualizer-attached memory or local private memory). More generally, while the foregoing discussion focuses primarily on mapping of virtualizer-associated LPAs to remote physical memory via fabric-address translation, a subset of the virtualizer-associated LPA range may resolve directly (i.e., without further address translation) to virtualizer-attached memory. Moreover, some portion of virtualizer-attached memory (if present at all) may be reserved by the virtualizer for operational data (storage of free queues and pointers thereto, state data for finite state machine 177) and/or fabric page table implementation.

Figure 3:
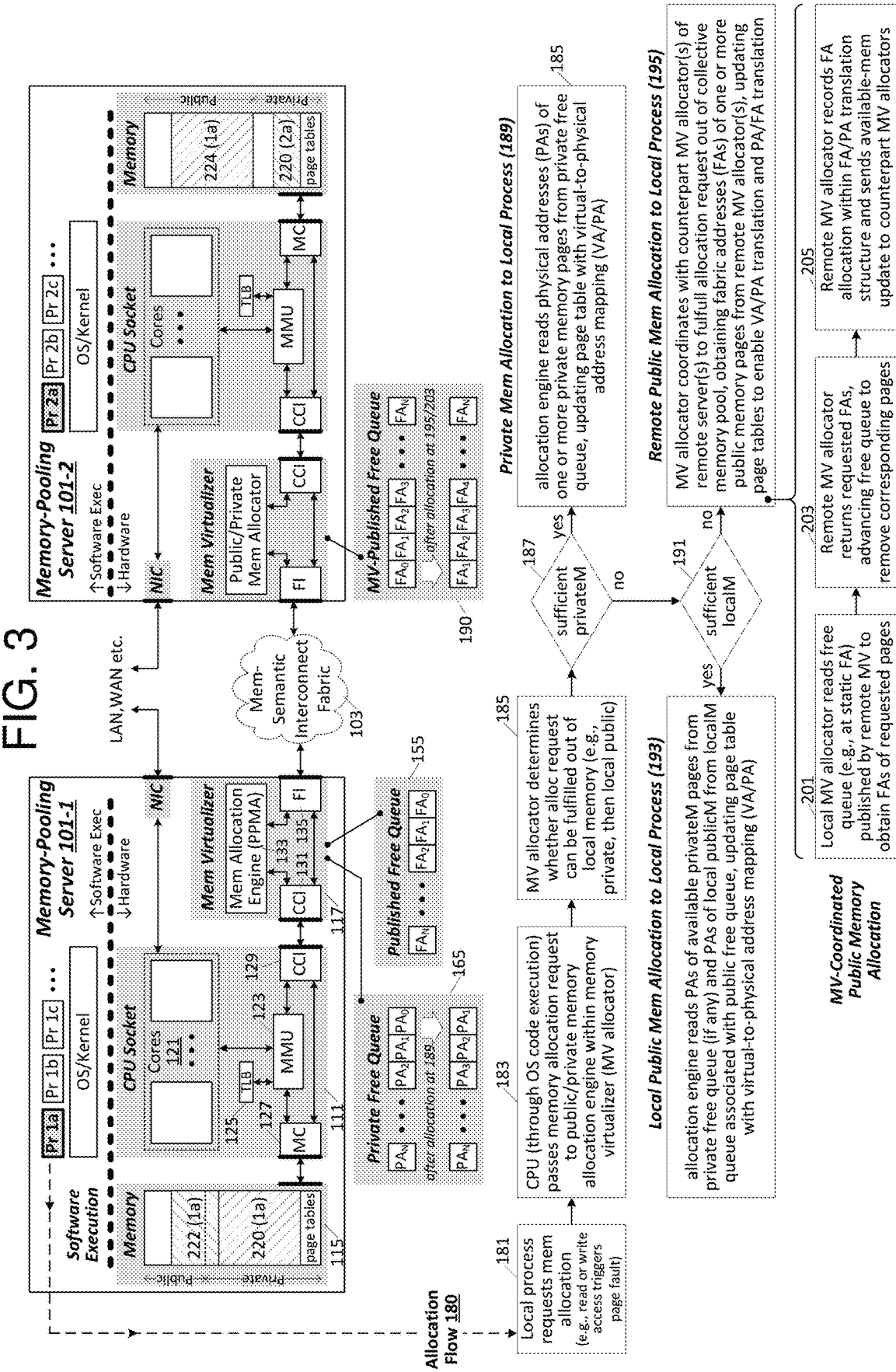
FIG. 3 illustrates an exemplary memory allocation flow within fabric-interconnected memory-pooling servers shown in FIG. 1 and in which the physical location of allocated memory is opaque to/hidden from the allocation-requesting process.

FIG. 3 illustrates an exemplary memory allocation flow 180 (i.e., operational sequence) within fabric-interconnected memory-pooling servers 101-1 and 101-2 ("local" and "remote" servers, respectively, implemented as discussed in reference to FIG. 1) in which the physical location of allocated memory is hidden from the allocation-requesting process. Starting at 181, a process (1a) executing on a local server 101-1 accesses a virtual address that has not yet been associated with a physical page of memory, resulting in a page fault. During the handling of the page fault, at 183, the local-server CPU 121 conveys the page allocation request to memory allocation engine 133 ("allocator" within memory virtualizer 117), for example, via an application programming interface (API) accessible through cache-coherent interfaces 129/131 or another signaling interface between CPU socket 111 and memory virtualizer 117. Upon receiving the allocation request, allocator 133 determines whether the request can be fulfilled out of private or public local memory at 185, for example by comparing the number of requested pages (allocation size) with the tail-to-head depth of private free queue 165 (i.e., a private local memory free queue). If sufficient private memory is available (affirmative determination at 187), the allocation engine completes the private memory allocation as shown at 189, for example, through the following actions:

obtaining (de-linking and thus removing) one or more local physical addresses ("PA" in FIG. 3) of private local memory pages from private free queue 165 in accordance with the number of pages needed to fulfill the allocation request (i.e., allocation size); and loading the physical addresses into a page table (maintained within a local storage of memory virtualizer 117 or within the private local memory itself (i.e., "page tables")) at locations indexed by a tuple of the kernel-supplied virtual address (sequenced according to the allocated page count) and identifier of the allocation-requesting process (e.g., maintained within a CPU register)—the page-table update to yield an affirmative result in response to subsequent page-table walk (i.e., upon returning from page fault handler).

Still referring to FIG. 3, if unable to fulfill the allocation request out of private memory (negative determination at 187), allocator 133 determines whether the allocation request can be fulfilled out of local memory generally—through a combination of remaining local private memory (if any) and local public memory. If so (affirmative determination at 191), then at 193 the allocator obtains physical addresses of any private memory pages to be allocated from private free queue 165 and obtains physical addresses of public memory pages from a local public memory free queue maintained by the virtualizer and associated with published free queue 155, updating the page table with the local physical address as discussed above. If allocable local memory is insufficient to meet the allocation request (negative determination at 191), allocation engine 133 coordinates with one or more allocation engines within remote memory-pooling servers to fulfill the allocation request in whole or part out of the collective memory pool as shown at 195, triggering an exclusive allocation of remote physical memory to the locally hosted process and obtaining fabric addresses (FAs) that are loaded into local translation structures (page tables and/or interface TLBs). In one embodiment, local allocator 133 initiates the remote public memory allocation by reading the free queue published by a remote memory virtualizer (e.g., reading from a fabric address that points to the head of the published free queue) to obtain fabric addresses of physical memory pages within the remote memory installation—an operation shown at 201. The remote allocator responds to the cross-fabric queue-read by de-linking the outgoing fabric addresses from the published free queue at 203 (see "after allocation" in published free-queue 190) and de-linking a corresponding physical address (PA or LPA) from the local public memory free queue and then, as shown at 205, recording the memory allocation/donation within an inbound (FA to PA) translation table. In an embodiment in which counterpart memory virtualizers 117 proactively communicate with one another regarding volume of public memory available for allocation (i.e., to enable each allocator to maintain its own record of memory available from other servers and various characteristics of that memory and/or its host server including latency, allocation-volatility, etc.), the memory virtualizer within remote server 101-2 may transmit an update to counterpart virtualizers to reflect the reduced public memory availability due to the allocation (also shown at 205).

Still referring to FIG. 3 and more specifically to the memory allocations shown within the physical memory installations 115 within servers 101-1 and 101-2, an initial private-memory allocation to processes 1a and 2a is shown at 220 (within respective process-hosting servers), followed by a blended private/public allocation to process 1a at 222 (an allocation that cannot be fulfilled exclusively out of private memory). When process 1a later requests another allocation that cannot be fulfilled out local memory (private and/or public), the allocation request is fulfilled by the inter-virtualizer coordination shown at 195 (and in detail at 201, 203, 205) and resulting allocation of remote memory within server 101-2 as shown at 224. Note that remote allocation 224 may instead be a blended allocation fulfilled in part from local memory (public and/or private) and in remaining part from remote public memory—allocations that may be implemented, in effect, by bifurcating the initial allocation request into a local allocation request and a remote allocation request and thus handled as shown at 189/193 and 195, respectively.

Figure 4:
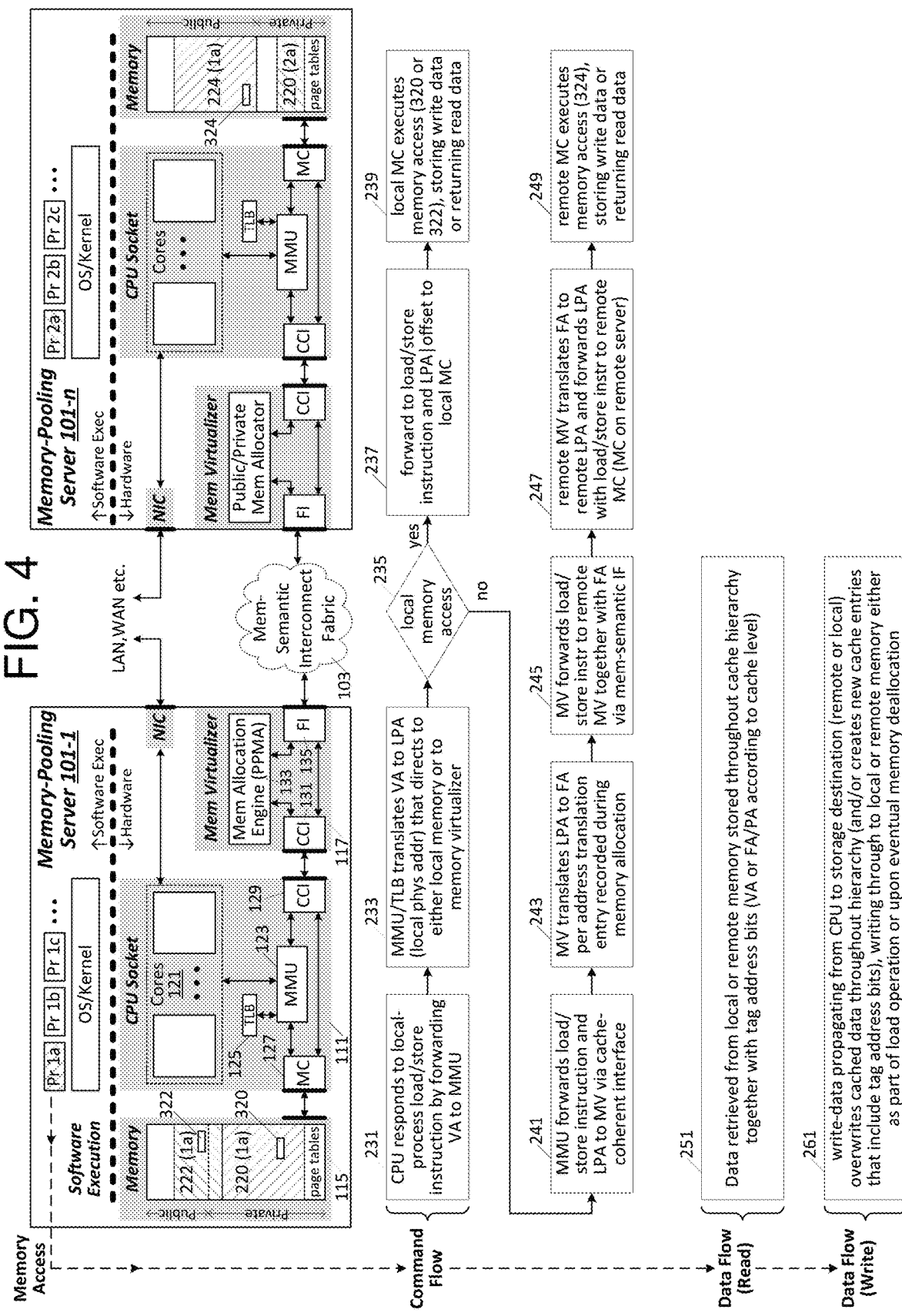
FIG. 4 illustrates exemplary command and data flows corresponding to execution of load and store instructions directed to the local memory allocations and remote memory allocations discussed in reference to FIG. 3.

FIG. 4 illustrates exemplary command and data flows corresponding to execution of load and store instructions directed to the local memory allocations (220, 222) and remote memory allocations (224) discussed in reference to FIG. 3. In the depicted embodiment, the physical disposition of allocated memory (on local server or remote server) is hidden from the grantee process—process 1a in this instance—and memory access requests are likewise issued by that process without awareness of the ultimate load/store destination. That is, the memory virtualizer hides memory access details from the hosted process (and to some extent the CPU and related components) and thus abstracts the physical memory, enabling hosted processes to perceive all memory wherever situated in a server cluster, data center or even wider distribution of computing machines as being resident (server in situ) memory over which it has exclusive control. As discussed below, in other embodiments, various features of physical memory relating to physical location (e.g., access latency) or other performance-impacting characteristics may be parametrically exposed to host processes, thus enabling refined allocations according to process requirements, price-varied virtual machine provisioning, and so forth.

Referring to the FIG. 4 command flow, upon encountering a hosted-process instruction to load data from or store data in memory at a virtual address (load/store@VA), the CPU forwards the virtual address to the MMU for translation (231). The MMU responds as shown at 233, translating the virtual address (via TLB hit or page-table walk) to a local physical address (LPA) that maps to either local public/private memory or to the memory virtualizer. If the LPA resolves to local memory (affirmative determination at 235), then the LPA is forwarded to the local memory controller together with the page offset field of the process-supplied virtual address at 237 (i.e., the LPA and page offset forming a tuple "LPA|offset"). The memory controller executes a local memory access at 239, reading or writing a data word at LPA|offset within either private memory or local public memory. These local memory access operations are depicted conceptually within memory 115 of server 101-1 at 320 and 322, respectively. Note that the local memory access occurs without involvement of the memory virtualizer, and thus with no additional latency relative to memory access within a conventional siloed-memory server as the access-direction decision at 235 (i.e., local memory or remote memory) incurs little or no additional overhead.

Continuing with the FIG. 4 command flow, if the local physical address resolves to memory virtualizer 117 and thus to physical memory within another server (i.e., negative determination at 235), the MMU forwards the load/store instruction to the memory virtualizer as shown at 241 (i.e., via cache-coherent interfaces 129/131 as discussed above) together with the local physical address. At 243, the virtualizer translates the LPA into a fabric address (e.g., accessing the outbound translation table entry stored during memory allocation) and then, at 245, forwards the load/store instruction and fabric address via the memory-semantic interconnect fabric to a counterpart memory virtualizer (remote MV) resident on a memory-pooling server. In the depicted embodiment, the remote memory virtualizer performs a reverse translation from fabric address to local physical address (accessing its inbound translation table—note that the LPA on the remote server is unrelated to the LPA on the access-requesting server except for their association with the same fabric address), forwarding that LPA together with the load/store instruction to the remote-server memory controller as shown 247 (i.e., forwarding local memory controller (MC) on remote server 101-n). At 249, the remote memory controller executes a memory access in response to the incoming load/store instruction, reading from or writing within a previously allocated region of local public memory (remote public memory from perspective of access-sourcing server 101-1) at the virtualizer-provided local physical address (depicted conceptually at 324 within server 101-n).

Referring to the data flow for a memory read (load instruction) shown at 251, data retrieved from local memory 115 is returned via local memory controller 127 to one or more CPU cores 121 (and thus to the load-requesting process hosted by the CPU) via a front-side bus or other signaling channel, populating data cache structures at various hierarchical levels en route. Data retrieved from remote memory (i.e., within server 101-n in the FIG. 3 example) is conveyed from the remote memory controller to remote virtualizer to local virtualizer to the local CPU socket, again populating local data cache structures during passage from the local cache-coherent interface 129/131 to the CPU. Note that, at least in the FIG. 4 embodiment, the remote-server MMU and TLB are bypassed and thus unburdened in an inter-server memory access (i.e., load/store conveyed to target server via interconnect fabric 103) as the incoming fabric address is translated within the virtualizer component. Likewise, read data flowing back across fabric 103 need not be cached (and is not cached in the depicted embodiment) within the data cache hierarchy of the server containing the accessed physical memory (i.e., no caching in server 101-n in the depicted embodiment). In alternative embodiments, the fabric addresses exchanged by counterpart virtualizers may be translated (by each virtualizer) to/from a virtual address instead of a local physical address. In those embodiments, the virtualizer may issue the virtual address (obtained through translation of an inbound fabric address) to the local CPU (or MMU/TLB within a local CPU socket) for translation to local physical address and thereafter for application to the local memory controller. Similarly, where beneficial, additional data caching structures may be provided within the virtualizer to supplement those in the CPU socket—caching data inbound from and/or outbound to remote servers.

In the memory write data flow shown at 261 (FIG. 4), data propagates via a path defined by the fabric-address from the CPU to either remote memory (propagating from local memory virtualizer to remote memory virtualizer via the memory-semantic interconnect fabric in the latter case), overwriting previously cached data corresponding to the virtual/physical address according to cache policy (i.e., write-through or write-back) and thus maintaining cache coherency regardless of remote/local location of underlying storage.

In a number of embodiments, the fabric address is a tuple of a virtual address field (that may be translated to or derived from a local physical address within the virtualizer of a given server) and a fabric node identifier (or global physical address) that identifies the memory-pooling server in which the target memory subsystem resides and thus enables address-directed routing through the memory-semantic interconnect fabric. In such embodiments the fabric node identifier may be stripped from an inbound fabric address (i.e., FA received from a remote virtualizer) to yield the virtual address component to be translated into a to local physical address. Similarly, upon receiving an LPA together with a load/store instruction destined for a remote server, the virtualizer may look up a corresponding virtual address (i.e., within the outbound TLB discussed in reference to FIG. 2—TLB implemented, for example, by a content addressable memory (CAM) that concurrently searches all CAM entries for a match with the LPA search key) and then prepend or append a previously assigned/programmed fabric node identifier to complete the fabric address. In alternative embodiments, the fabric address may be a tuple of the fabric node identifier and the local physical address itself, obviating virtual-to-physical and physical-to-virtual address translation within counterpart virtualizers. In yet other embodiments, the fabric node identifier may be omitted from the fabric address altogether and provided instead in the form of protocol information distinct from the payload (load/store instruction and virtual or physical address) conveyed via the memory-semantic interconnect fabric.

FIG. 5 presents a conceptual example of read data flow and data population within a cache hierarchy that includes L1, L2, ..., and LL (Last-Level) data cache memories (281-1, 281-2, 281-L). Tag bits extracted from the process-supplied virtual address or corresponding physical or fabric address (depending on location of a given cache level within the virtual-to-physical address translation path) are recorded in association with the cached data to enable subsequent access out of cache regardless of the physical location (local or remote) of the underlying operating memory. Thus, beyond possible tag-field expansion (i.e., to account for allocable memory expansion made possible by collective memory pool), the data cache hierarchy functions coherently with respect to both local and remote memory access (through memory controller 127 or cache-coherent interface 129, with retrieved data being stored in the caches as it propagates to the requesting process (hosted by CPU). In the case of a data store operation, write-through or write-back operations are effected throughout the data cache hierarchy (i.e., per cache policy), so that cache coherency is maintained regardless of whether the underlying physical memory location being written is local or remote.

FIG. 6 illustrates more detailed memory access circuitry that may be deployed within local and remote fabric-interconnected memory-pooling servers 301 and 303 according to one embodiment, showing an exemplary interconnection between a local CPU 305-L, local memory virtualizer 117L and local memory 115L within local ("access-requesting") server 301 and between a remote memory virtualizer 117R, remote CPU 305R and remote memory 115R within remote ("access-fulfilling") server 303. Referring first to server 301, a virtual address (VA) propagates from the CPU core (i.e., address register containing virtual address supplied by hosted-process in connection with load/store instruction, not specifically shown) to local MMU 311 and TLB 315. The CPU core may also supply a VA-qualifying process number or process identifier, PN (e.g., maintained by the CPU within a process ID register), to the MMU and TLB to enable differentiation between overlapping virtual address ranges granted to respective extant processes (optional with respect to TLB 315 as its contents may be invalidated at each process switch). If the PN:VA tuple indexes to a valid LPA entry within TLB 315, the TLB outputs the LPA to the MMU (or directly to downstream circuitry) which in turn supplies the LPA to local memory controller 325L and cache coherent interface 131L, each of which have been programmed or otherwise configured to respond to local physical addresses within respective ranges (or sets of ranges). If the PN:VA tuple yields no match within the TLB 315, a TLB miss is signaled to MMU 311 which responsively indexes the local page table (i.e., within private local memory—illustrated conceptually at 318) using the PN:VA tuple to obtain a local physical address (e.g., updating the TLB and optionally retrying the TLB after update).

Continuing with FIG. 6, if the LPA maps to local memory 115L, local memory controller 325L executes a memory read or write transaction within local memory 115L according to the load/store instruction that accompanied the virtual address, retrieving read data from the local physical address in response to a load instruction, and storing write-data at the local physical address in response to a store instruction (i.e., write data conveyed in association with the store instruction). If the LPA maps to memory virtualizer 117L, the LPA is conveyed via counterpart cache coherent interfaces 131L/327L to bidirectional translation circuitry 329L for outbound translation (lookup) into a fabric address (FA). Fabric interface 331L then transmits the fabric address and load/store instruction to remote server 303 via memory-semantic interconnect fabric 103. The fabric interface 135R of remote server 303 (i.e., within remote virtualizer 117R) receives the fabric-conveyed load/store instruction and fabric address, forwarding the fabric address to bidirectional translation circuit 329R for inbound translation to a remote-server physical address (a local physical address within the remote server). The remote-server LPA and load/store instruction are routed via cache coherent interfaces 327R and 131R to the remote server memory controller 325R to carry out the specified access with respect to remote memory 115R. That is, remote memory controller 325R retrieves read data from remote memory 115R (from a location, specified by the local physical address, within a physical memory page exclusively allocated to server 301) in response to a load instruction and stores write data in response to a store instruction, returning the read data to the requesting server 301 via the memory-semantic interconnect fabric 103 and receiving the write data from server 303 via the interconnect fabric. In the FIG. 6 embodiment, circuitry provided to enable one memory-pooling server to issue load/store instructions to be executed within a memory allocation on the other (i.e., memory virtualizers 117L/117R, cache coherent interfaces 327L/327R) is symmetrically (identically) implemented within each server, thus enabling either server to be the load/store instruction issuer to the other, with the control and data flow described with respect to servers 301/303 being reversed in other transactions (i.e., fabric address flowing from server 303 to server 301). Not all data and control signaling paths are shown and the circuitry provided to direct a given memory access alternately to local or remote memory and enable various components in the control and data flow may vary from the conceptual implementations presented.

FIG. 7 illustrates an exemplary hierarchical organization of memory-pooling servers 101 within a data center. At a first level of the hierarchy, referred to herein as fabric-level 1 (FL1), individual groups of N memory-pooling servers 101 (each having two CPU sockets and two corresponding local memory installations in the example) are directly coupled to one another via a memory-semantic interconnect fabric (N=16 in the FL1 example shown). At a second level of the hierarchy a switch structure 381 (Level-1 Switch) interconnects a number (M) of FL1 groups into a fabric-level 2 group, FL2 (i.e., M×N memory-pooling servers, where M=N=16 and thus 256 servers per FL2), and at the third hierarchical level, another switch structure 391 (Level-2 Switch) interconnects a number (K) of FL2 groups into an FL3 data-center-wide group. K=8 in the depicted example, so that the data center contains 2048 memory-pooling servers including 128 FL1 groups and 8 FL2 groups. The hierarchical arrangement enables all servers in the data center (all within FL3) to contribute to and receive exclusive allocations out of a collective memory pool, with memory accesses directed to the collective memory pool exhibiting ascending latency according to traversed hierarchical levels. For example, load/store transactions directed to non-local public memory within an FL1 group incurs the nominal latency of the memory-semantic fabric, whereas transactions between servers in different FL1 groups, but the same FL2 group incur the fabric overhead plus overhead of one switch level, and transactions between servers in different FL2 groups incur the fabric overhead plus overhead of two switch-levels. Graph 400 illustrates average memory-access latencies and collective memory pool size within the FL1/FL2/FL3 server hierarchy, assuming, for example, that the local memory coupled to each CPU socket is a 768 GB DRAM installation and that half of each installation is contributed to the public memory pool (i.e., half of each DRAM installation reserved as private memory). The percentages shown with respect to each latency metric refer to the relative numbers of accesses directed to respective physical memory locations.

In a number of embodiments, latencies and other characteristics and features of remotely available memory may be exposed to the operating systems and processes executing within a given memory-pooling server, enabling allocation requests to be differentiated and parameterized. With regard to specific memory features, for example, each memory virtualizer may publish, together with or as part of the public free queue (i.e., together with fabric address within each linked-list element), various characteristics of the memory donated to the collective pool and/or capabilities/characteristics of the donating server and thus enable remote allocation requestors to issue refined/targeted allocation requests according to process requirements. FIG. 8 illustrates this approach, contrasting feature-opaque and feature-exposed memory allocation requests 441 and 443 in the form of C-code (or pseudo-code) memory allocation function calls. In the feature-opaque instance, a requesting process issues a malloc instruction (execution of one or more compiled machine instructions corresponding to pseudo code line at 441) that requests a pointer to an allocation of memory sufficient to enable storage of a thousand instances of a data structure ("mydatastructure")—an allocation request that may be fulfilled out of any free local and/or remote-public memory without regard (or informing of the requesting process) of the location or other details of the allocated physical memory or server on which that memory resides. By contrast, in feature-exposed example, a differentiated memory allocation function ("dmalloc") call includes parameters that enable the allocation-requesting process to refine and control the character, features and (at least from a latency standpoint) relative physical location of the allocated memory. In the depicted instance, for example, the dmalloc call enables parameterized specification of a not-to-exceed average latency of the allocated memory (constraining the allocation to a latency-defined subset of the collective memory pool—including a blended ratio that meets the average latency limit), an encryption level (if any), pre-allocation/post-allocation memory initialization "init" (e.g., zero upon allocation, zero upon deallocation or any combination thereof, or no initialization), non-volatile storage backing (e.g., write content of DRAM allocation to non-volatile storage on power down or security breach) and so forth.

In yet other embodiments, the allocation may request (e.g., via pointer specification) a specific region of physical memory that has been pre-loaded with data by another process executing on the same or different server—enabling, inter-process messaging or other data-sharing between processes executing on different servers in which physical memory allocated to and written/loaded by one process is then deallocated by that process with data left in place. Thereafter, that pre-loaded memory may be allocated to another process (i.e., that has received a pointer to or other identifier of the pre-loaded memory) to effect the inter-process data exchange without the overhead of conventional buffer copy messaging approaches (rendering two instances of the data). More generally, a page of memory exclusively allocated to one process (or operating system or server) may be, for example upon grant of permission from that process, accessed by one or more other processes (or operating systems, etc.). Such operation enables shared memory between servers by allowing a single server to allocate memory and then, by using a message passing interface, that same server could allow access to the memory by other servers in the pool by communicating/identifying the memory virtualizer through which other servers are permitted to read/write to the allocated region of memory (or subset thereof). Further, the split between public and private memory within a given memory-pooling server may be strategically selected in accordance with physical memory implementation (e.g., splitting at memory rank level, memory module level, memory channel level, etc.) so as to optimize opportunities for access concurrency (and conversely minimize congestion between locally and remotely requested accesses). The public/private memory split may be dynamically updated (i.e., changed during server runtime) based on policies implemented within the host server of the memory-virtualizer and physical memory installation or in response to instructions from a centralized memory-control entity (e.g., process executing on another server) within a data center or wider collection of memory-pooling servers. Also, while the memory virtualizer component described in a number of embodiments herein performs memory allocation for both local private memory (i.e., to the local CPU/OS) and public memory, in alternative embodiments the local kernel/OS may manage allocation of the local private memory instead of the virtualizer. Further, the virtualizer may itself include a local memory installation or "virtualizer-attached memory" which may form part of the local private and/or public memory of the host server—that is, memory that may be allocated to and accessed by local or remote processes and/or used in whole or part by the virtualizer (e.g., for storage of page tables for translation of virtual addresses to physical addresses (relocating the page table from local memory to virtualizer-attached memory), and/or for translation between local physical addresses and fabric addresses (i.e., bidirectionally according to whether access direction is outbound or inbound). More generally, at least the following features are enabled by the fabric-interconnected memory-pooling servers:

- Physical memory exclusively allocated within a given memory-pooling server for access/use by another server
- Physical memory exclusively allocable to a given memory-pooling server exceeds physical memory resident within that server;
- Physical location of allocated memory opaque to process-hosting CPU
- Physical memory within each server of a data center is partitioned between restricted (private) memory and unbounded (public) memory, private memory reserved to host server/local CPU socket(s) and public memory being available for global (data-center wide) allocation and thus forming part of collective memory pool
- Dynamic (run-time) adjustment of private/public partition
- Policy-driven allocation of collective memory (e.g., latency-based allocation scheme)
- Allocation of private and public memory unified within memory virtualizer component;
- Private/collective memory allocation to local CPU according to per-server or data-center centralized policy;
- Collective memory allocation executed through collaboration with memory virtualizer within remote server(s);
- Memory virtualizer generates and maintains free-queue of local memory allocated to collective memory start-up time generation of free memory queue; etc.
- Inter-virtualizer messaging that renders each virtualizer component aware of memory available on other memory-pooling servers (and thus the total available memory pool with respect to the host server of a given virtualizer component) as well as performance metrics with respect to that memory (e.g., latency, bandwidth, physical distance, security, non-volatile backing, etc.)

Memory-only server node in which there is no compute function—merely virtualizer component and local memory (e.g., attached to or included within virtualizer) or virtualizer-accessible via dedicated memory controller (e.g., server instantiation as discussed above without process-hosting capability or other compute function)

Memory virtualizer component as described above, but lacking a fabric interface and dedicated instead to memory allocation for local CPUs (i.e., as discussed above). That is, a memory allocation engine for the local system (i.e., local CPUs, local memory) accessible via a cache coherent link performs all the memory virtualizer tasks described above, but only within one server. In such an embodiment, a kernel/OS may allocate physical memory via the memory allocation engine and the allocation engine can enable multiple virtual machines (VMs) to potentially share access to the same local memory across kernel/OS instances.

The operating system/kernel may issue an API call to the memory virtualizer to have the virtualizer set up the pages tables for a process and update them as necessary, the kernel would send the virtual address to be mapped (by the virtualizer) to a physical memory page (i.e., VA to LPA mapping) along with the any flags or other parameters useful for tailoring that mapping. Alternatively, the memory allocation and VA/LPA mapping may be implemented as part of (or triggered by) a page fault handler. Such an approach enables the following functionality/features:

ability to dynamically change address translation policy and sequence (e.g., increasing the number of translations per access such that a fabric address could be incorporated), allowing a single page table to exist that could translate from virtual to physical to fabric (e.g., with no redundant device on the memory virtualizer component—the system page tables could reside on the virtualizer as well).

when enabled to modify the system page tables, allocate physical pages of memory and write data to local memory, the memory virtualizer can autonomously move pages between local memory and local/remote memory tiers (e.g., virtualizer can allocate a new page, copy the old data to the new page, and update the page table to complete the move, and free the old page if it's a move rather than a copy) potentially with some kernel/OS/VMM interaction. A memory virtualizer thus enabled may also execute background tasks conventionally handled by the kernel/VMM/OS such as scanning memory to find and consolidate duplicate pages (e.g., mapping virtual addresses of the duplicate pages to a single copy and deleting of the extra copy).

The various component circuit blocks disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the memory volumes, memory types, specific address field sizes, address translation schemes and the like may be different from those shown in alternative embodiments. Memory-pooling servers may be deployed in various organizations other than those shown. Additionally, interconnections between memory-pooling servers or internal components or blocks thereof may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit or component is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A first memory allocation device for deployment within a host server computer, the first memory allocation device comprising:

a first interface to a local processing unit disposed within the host computer and local operating memory disposed within the host computer;
a second interface to a remote computer;
control circuitry coupled to the first and second interfaces to:
   allocate a first portion of the local memory to a first process executed by the local processing unit;
   transmit, to the remote computer via the second interface, a request to allocate to a second process executed by the local processing unit a first portion of a remote memory disposed within the remote computer;
   receive instructions via the first interface to store data within and retrieve data from one or more memory addresses that correspond to storage locations within the first portion of the remote memory;
   transmit, to the remote computer via the second interface, the instructions to store data within and read data from the storage locations within the first portion of the remote memory; and
   receive, via the second interface, a request from the remote computer to allocate a second portion of the local memory on behalf of a third process executing on the remote computer.

2. The first memory allocation device of claim 1 wherein the second interface to the remote computer comprises an interface compliant with a cache-coherent communication standard.

3. The first memory allocation device of claim 1 wherein circuitry to receive the request from the remote computer to allocate the second portion of the local memory comprises circuitry to allocate the second portion of the local memory to the third process by removing a physical address corresponding to the second portion of the local memory from a first data structure that contains physical addresses of allocable portions of the local memory.

4. The first memory allocation device of claim 3 wherein the circuitry to receive the request from the remote computer to allocate the second portion of the local memory additionally receives, in association with the request from the remote computer, a first address to be used by the remote computer to access the second portion of the local memory, and wherein the circuitry to allocate the second portion of the local memory additionally stores the physical address corresponding to the second portion of the local memory at a location within a first address translation structure that is indexed by the first address such that the first address may be applied to the first address translation structure to obtain the physical address corresponding to the second portion of the local memory.

5. The first memory allocation device of claim 4 further comprising circuitry to receive, via the second interface, instructions from the remote computer to store data within and retrieve data from one or more memory addresses that correspond to storage locations within the second portion of the local memory.

6. The first memory allocation device of claim 5 wherein the circuitry to receive instructions from the remote computer to store data within and retrieve data from the one or more memory addresses that correspond to storage locations within the second portion of the local memory comprises circuitry to receive, as at least a portion of the one or more memory addresses, the first address and to apply the first address to the first address translation structure to obtain the physical address corresponding to the second portion of the local memory.

7. The first memory allocation device of claim 6 further comprising circuitry to transmit, to a memory control circuit within the local processing unit via the first interface, the physical address obtained from the first address translation structure and the instructions to store data within and retrieve data from the one or more memory addresses that correspond to storage locations within the second portion of the local memory.

8. The first memory allocation device of claim 1 wherein the control circuitry to allocate the first portion of the local memory to a first process executed by the local processing unit comprises circuitry to:
   receive a virtual address from the local processing unit; and
   store, at a location within a page table associated with the virtual address, a physical address mapped to the first portion of the local memory.

9. The first memory allocation device of claim 1 wherein the control circuitry to transmit the request to allocate the first portion of the remote memory to the second process comprises circuitry to obtain a first address from the remote computer and to store the first address within an address translation structure at a location associated with a virtual address supplied by the local processing unit on behalf of the second process.

10. The first memory allocation device of claim 1 wherein the control circuitry comprises circuitry to transmit, to the remote computer via the second interface, a request to allocate to the first process executed by the local processing unit a second portion of the remote memory disposed within the remote computer.

11. A method of operation within a first memory allocation device deployed within a host server computer and having first and second interfaces, the method comprising:
   allocating a first portion of a local memory to a first process executed by a local processing unit, the local memory and local processing unit being disposed within the host computer;
   transmitting, to a remote computer via the second interface, a request to allocate to a second process executed by the local processing unit a first portion of a remote memory disposed within the remote computer;
   receiving instructions via the first interface to store data within and retrieve data from one or more memory addresses that correspond to storage locations within the first portion of the remote memory;
   transmitting, to the remote computer via the second interface, the instructions to store data within and read data from the storage locations within the first portion of the remote memory; and
   receiving, via the second interface, a request from the remote computer to allocate a second portion of the local memory on behalf of a third process executing on the remote computer.

12. The method of claim 11 wherein transmitting the request to allocate to the first portion of the remote memory via the second interface comprises transmitting the request via an interface compliant with a cache-coherent communications standard.

13. The method of claim 11 further comprising allocating the second portion of the local memory to the third process by removing a physical address corresponding to the second portion of the local memory from a first data structure that contains physical addresses of allocable portions of the local memory.

14. The method of claim 13 wherein receiving the request from the remote computer to allocate the second portion of the local memory comprises receiving a first address to be used by the remote computer to access the second portion of the local memory, and wherein allocating the second portion of the local memory comprises storing the physical address corresponding to the second portion of the local memory at a location within a first address translation structure that is indexed by the first address such that the first address may be applied to the first address translation structure to obtain the physical address corresponding to the second portion of the local memory.

15. The method of claim 14 further comprising receiving, via the second interface, instructions from the remote computer to store data within and retrieve data from one or more memory addresses that correspond to storage locations within the second portion of the local memory.

16. The method of claim 15 wherein receiving instructions from the remote computer to store data within and retrieve data from the one or more memory addresses that correspond to storage locations within the second portion of the local memory comprises (i) receiving, as at least a portion of the one or more memory addresses, the first address and (ii) applying the first address to the first address translation structure to obtain the physical address corresponding to the second portion of the local memory.

17. The method of claim 16 further comprising transmitting, to a memory control circuit within the local processing unit via the first interface, the physical address obtained from the first address translation structure and the instructions to store data within and retrieve data from the one or more memory addresses that correspond to storage locations within the second portion of the local memory.

18. The method of claim 11 wherein allocating the first portion of the local memory to a first process executed by the local processing unit comprises:
   receiving a virtual address from the local processing unit; and
   storing, at a location within a page table associated with the virtual address, a physical address mapped to the first portion of the local memory.

19. The method of claim 11 wherein transmitting the request to allocate the first portion of the remote memory to the second process comprises obtaining a first address from the remote computer and storing the first address within an address translation structure at a location associated with a virtual address supplied by the local processing unit on behalf of the second process.

20. The method of claim 11 further comprising transmitting, to the remote computer via the second interface, a request to allocate to the first process executed by the local processing unit a second portion of the remote memory disposed within the remote computer.

21. A method of operation within a first computing device having a processing unit, operating memory, memory allocation unit, and first interface, the method comprising:
   allocating a first region of the operating memory for read and write access exclusively in response to instructions within a first process executed by the processing unit;
   receiving a request to allocate memory to a second computing device coupled to the first memory device via an interconnect-fabric coupled to the first interface; and
   allocating a second region of the operating memory for read and write access exclusively in response to instructions received from the second computing device via the first interface.

22. The method of claim 21 wherein allocating the second region of the operating memory for read and write access exclusively in response to instructions received from the second computing device comprises allocating the second region of the operating memory for access in response to load and store instructions received exclusively from the second computing device via the first interface, each of the load and store instructions accompanied by a respective address, conveyed via the interconnect-fabric and received via the first interface, that resolves to a respective storage location within the second region of memory.

23. The method of claim 22 further comprising translating each of the respective address received via the first interface in accompaniment with each of the load and store instructions to a physical address that decodes to the respective storage location within the second region of memory.

* * * * *